US012597022B2

(12) United States Patent
Balasubramanian et al.

(10) Patent No.: US 12,597,022 B2
(45) Date of Patent: Apr. 7, 2026

(54) SYSTEM, METHOD, AND COMPUTER PROGRAM PRODUCT FOR AUTHENTICATING A TRANSACTION BASED ON BEHAVIORAL BIOMETRIC DATA

(71) Applicant: Visa International Service Association, San Francisco, CA (US)

(72) Inventors: Chandra S. Balasubramanian, Shaker Heights, OH (US); Douglas Fisher, Mountain View, CA (US); Nicholas Edward Vondrak, San Carlos, CA (US)

(73) Assignee: Visa International Service Association, San Francisco, CA (US)

( * ) Notice: Subject to any disclaimer, the term of this patent is extended or adjusted under 35 U.S.C. 154(b) by 110 days.

(21) Appl. No.: 17/632,319

(22) PCT Filed: Aug. 7, 2020

(86) PCT No.: PCT/US2020/045429
§ 371 (c)(1),
(2) Date: Feb. 2, 2022

(87) PCT Pub. No.: WO2021/026464
PCT Pub. Date: Feb. 11, 2021

(65) Prior Publication Data
US 2022/0230166 A1 Jul. 21, 2022

Related U.S. Application Data

(60) Provisional application No. 62/898,200, filed on Sep. 10, 2019, provisional application No. 62/884,069, filed on Aug. 7, 2019.

(51) Int. Cl.
*G06Q 20/38* (2012.01)
*G06F 21/32* (2013.01)

(52) U.S. Cl.
CPC ......... *G06Q 20/3821* (2013.01); *G06F 21/32* (2013.01)

(58) Field of Classification Search
None
See application file for complete search history.

(56) References Cited

U.S. PATENT DOCUMENTS 8,200,980 B1 6/2012 Robinson et al.
8,554,685 B2 * 10/2013 Patterson ............... G06Q 20/40
705/52

(Continued)

FOREIGN PATENT DOCUMENTS

CN 108292398 A 7/2018
CN 108293054 A 7/2018

OTHER PUBLICATIONS

Bailey et al., "User Identification and Authentication using Multi-Modal Behavioral Biometrics" Computer & Security, Feb. 7, 2014, 13 pages.

*Primary Examiner* — Christopher Bridges
(74) *Attorney, Agent, or Firm* — The Webb Law Firm

(57) ABSTRACT

Provided are a system, method, and computer program product for authenticating a transaction based on behavioral biometric data. The method includes receiving an authorization request message associated with a transaction between a merchant system and a payment device. The method also includes determining that an additional security authentication should be applied to the authorization request message based on transaction data. The method further includes communicating an authenticity assessment request to a behavioral biometrics server computer and receiving, from the behavioral biometrics server computer, an authenticity assessment response generated based on at least a portion of the transaction data. The method further includes generating, based on the authenticity assessment response, (Continued)

an authentication response message configured to authenticate or decline the transaction.

11 Claims, 4 Drawing Sheets

(56)                    References Cited

U.S. PATENT DOCUMENTS

| 8,885,894 | B2 * | 11/2014 | Rowen | G06Q 20/10 |
| | | | | 705/16 |
| 9,516,035 | B1 * | 12/2016 | Moritz | G06F 21/602 |
| 9,596,237 | B2 | 3/2017 | Law et al. | |
| 9,911,146 | B2 * | 3/2018 | Siegal | G06Q 20/085 |
| 9,966,864 | B2 | 5/2018 | Chen et al. | |
| 10,440,016 | B2 * | 10/2019 | Oberheide | H04L 63/0876 |
| 10,755,281 | B1 * | 8/2020 | Yip | G06Q 20/4016 |
| 11,080,702 | B2 | 8/2021 | Sukhija et al. | |
| 11,250,410 | B2 | 2/2022 | Mokhasi et al. | |
| 11,599,619 | B1 * | 3/2023 | Duke | G06F 21/36 |
| 12,177,200 | B1 * | 12/2024 | Lester | G06F 21/566 |
| 2008/0113791 | A1 | 5/2008 | Williams et al. | |
| 2010/0115610 | A1 | 5/2010 | Tredoux et al. | |
| 2012/0323734 | A1 | 12/2012 | Dominguez et al. | |
| 2013/0073463 | A1 | 3/2013 | Dimmick et al. | |
| 2015/0120560 | A1 * | 4/2015 | Fisher | G06Q 20/34 |
| | | | | 705/44 |
| 2015/0287028 | A1 * | 10/2015 | DeLuca | G06Q 20/382 |
| | | | | 705/44 |
| 2015/0363785 | A1 | 12/2015 | Perez et al. | |
| 2016/0057623 | A1 | 2/2016 | Dutt et al. | |
| 2016/0259924 | A1 | 9/2016 | Dutt et al. | |
| 2017/0085563 | A1 * | 3/2017 | Royyuru | G06Q 20/12 |
| 2017/0171195 | A1 | 6/2017 | Chang et al. | |
| 2019/0019232 | A1 | 1/2019 | Joshi et al. | |
| 2020/0042972 | A1 | 2/2020 | Wang et al. | |
| 2020/0079320 | A1 | 3/2020 | Lacoss-Arnold | |
| 2020/0402044 | A1 | 12/2020 | Vyas et al. | |
| 2023/0385841 | A1 * | 11/2023 | Merz | G06Q 20/10 |

* cited by examiner

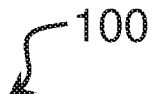
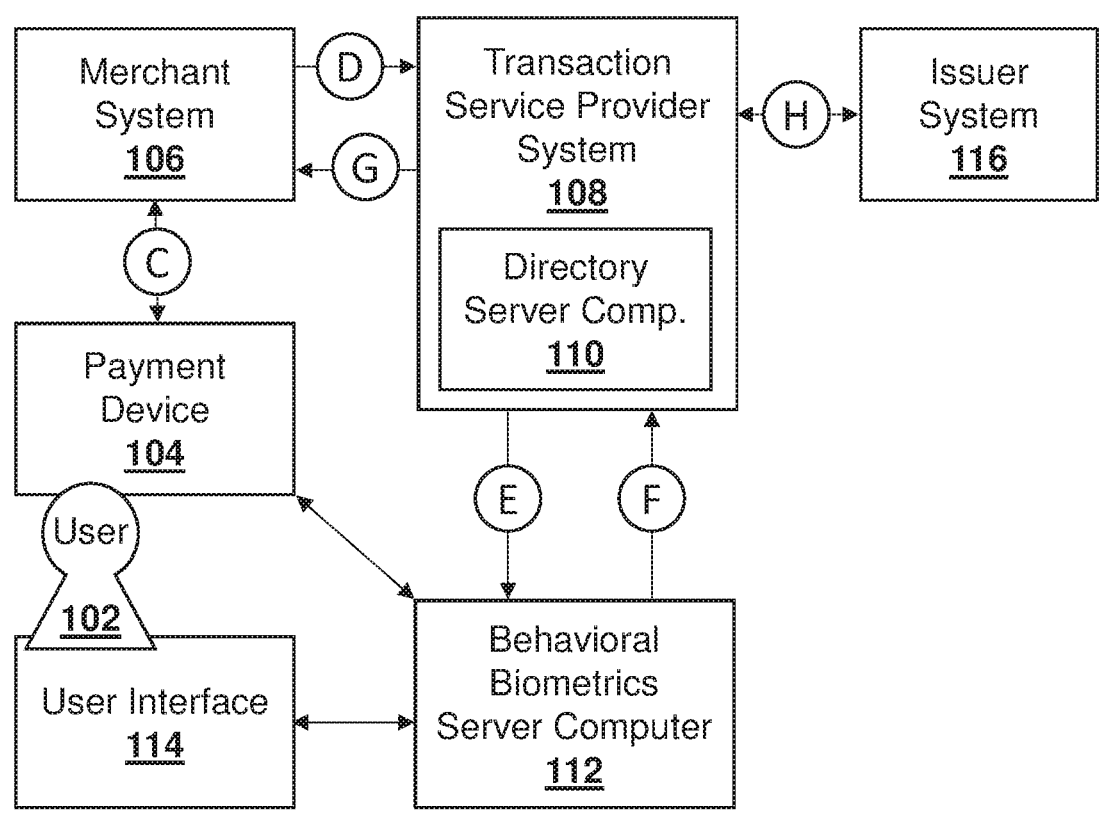
FIG. 1

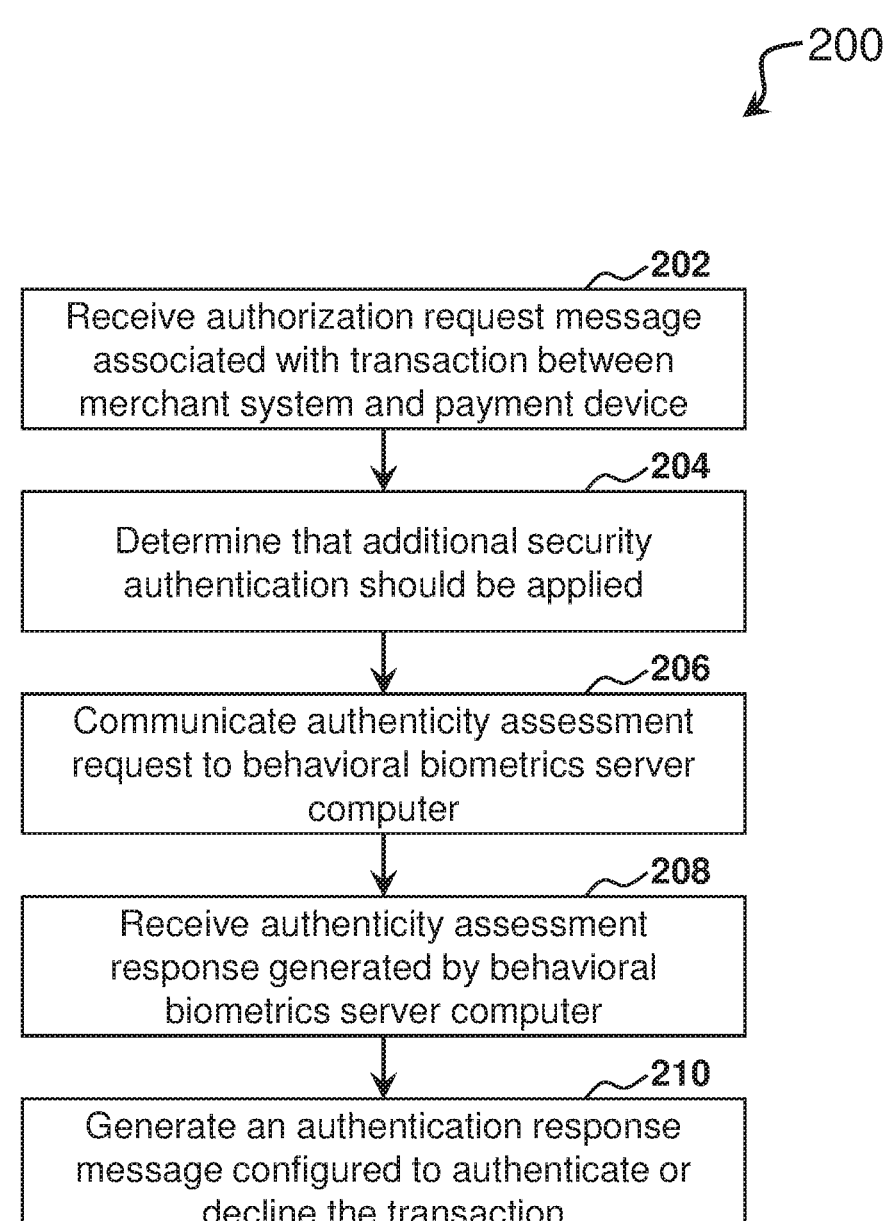

_200_

_202_

Receive authorization request message associated with transaction between merchant system and payment device

_204_

Determine that additional security authentication should be applied

_206_

Communicate authenticity assessment request to behavioral biometrics server computer

_208_

Receive authenticity assessment response generated by behavioral biometrics server computer

_210_

Generate an authentication response message configured to authenticate or decline the transaction

FIG. 2

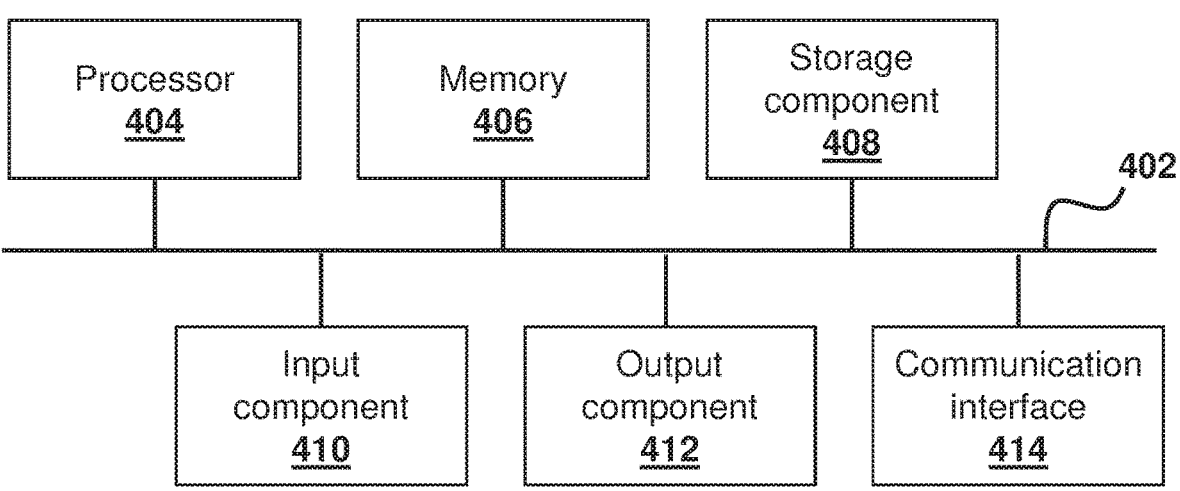
FIG. 4

SYSTEM, METHOD, AND COMPUTER PROGRAM PRODUCT FOR AUTHENTICATING A TRANSACTION BASED ON BEHAVIORAL BIOMETRIC DATA

CROSS REFERENCE TO RELATED APPLICATIONS

This application is the United States national phase of International Application No. PCT/US2020/045429 filed Aug. 7, 2020, and claims priority to U.S. Provisional Patent Application No. 62/884,069, filed on Aug. 7, 2019, and to U.S. Provisional Patent Application No. 62/898,200, filed on Sep. 10, 2019, the entire disclosures of which are incorporated by reference herein.

BACKGROUND

1. Technical Field

This disclosure relates generally to authentication and, in one particular non-limiting embodiment, to a system, method, and computer program product for authenticating a transaction based on behavioral biometric data.

2. Technical Considerations

Transactions may involve one or more users (in possession of one or more payment devices) and one or more merchants. For example, one or more users may initiate transactions at a point-of-sale terminal, online via a webpage, and/or the like. During such transactions, the validity of the transaction initiated with a payment device may be verified by requesting a card verification value (CVV), and/or similar information. However, requesting such additional information may not enable systems processing such transactions to verify the identity of the user in possession of the payment device.

Where the identity of the individual cannot be easily obtained, the possibility that a transaction is being initiated fraudulently may be increased. For example, where a payment device is lost and another user not associated with the payment device attempts to use the payment device, fraudulent transactions may be initiated by the individual attempting to use the payment device. To counter this, systems processing transactions may further scrutinize transactions to determine whether they are fraudulent, which, in turn leads to an additional expense in computational resources and/or processing time. This, in turn, may affect subsequent transactions and, depending on transaction volume, may cause transactions to be declined that would otherwise be approved.

SUMMARY

Accordingly, and generally, provided are improved computer-implemented systems, methods, and computer program products for authenticating a transaction based on behavioral biometric data.

According to non-limiting embodiments or aspects, provided is a computer-implemented method for authenticating a transaction based on behavioral biometric data. The method includes receiving, with a transaction service provider system including at least one processor, an authorization request message associated with a transaction between a merchant system and a payment device. The authorization request message includes transaction data. The method also includes determining, with the at least one processor, that an additional security authentication should be applied to the authorization request message based on the transaction data. The method further includes communicating, with the at least one processor, an authenticity assessment request to a behavioral biometrics server computer in response to determining that the additional security authentication should be applied, the authenticity assessment request including at least a portion of the transaction data. The method further includes receiving, with the at least one processor from the behavioral biometrics server computer, an authenticity assessment response generated by the behavioral biometrics server computer in response to the authenticity assessment request and based on the at least a portion of the transaction data. The method further includes generating, with the at least one processor based on the authenticity assessment response, an authentication response message configured to authenticate or decline the transaction.

In some non-limiting embodiments or aspects, the authorization request message may be initiated by a user of the payment device through a merchant webpage or mobile application. The authenticity assessment request may be communicated to the behavioral biometrics server computer while the user is responding to a second factor authentication process in the merchant webpage or the mobile application. The method may include embedding a behavioral biometrics service in the merchant webpage or the mobile application based on a first uniform resource locator (URL) and a second URL, wherein the first URL points to a domain of an issuer system and the second URL points to a domain of the behavioral biometrics server computer. The method may include, in response to the authenticity assessment response indicating a lack of authenticity of the user and/or the payment device, communicating an alert to at least one of the merchant webpage, the mobile application, and the issuer system.

In some non-limiting embodiments or aspects, the method may include communicating, with the at least one processor, the authentication response message to an issuer system associated with the issuer of the payment device. The authentication response message may be configured to authenticate or decline the transaction when evaluated by the issuer system in combination with a user response to the second factor authentication process.

In some non-limiting embodiments or aspects, the authentication assessment response may be based on behavioral biometrics signals associated with the payment device and/or user that are collected, prior to the transaction being initiated, by the behavioral biometrics server computer in a separate communication channel to a transaction processing network of the transaction service provider system.

In some non-limiting embodiments or aspects, the method may include configuring the authentication response message to authenticate or decline the transaction based on a comparison of the authenticity assessment response to a predetermined threshold provided by the merchant system.

According to non-limiting embodiments or aspects, provided is a system for authenticating a transaction based on behavioral biometric data. The system includes at least one server computer including at least one processor. The at least one server computer is programmed and/or configured to receive an authorization request message associated with a transaction between the merchant system and a payment device. The authorization request message includes transaction data. The server computer is programmed and/or configured to determine that an additional security authentication should be applied to the authorization request message based on the transaction data. The server computer is programmed and/or configured to communicate an authenticity assessment request to a behavioral biometrics server computer in response to determining that the additional security authentication should be applied. The authenticity assessment request includes at least a portion of the transaction data. The server computer is programmed and/or configured to receive, from the behavioral biometrics server computer, an authenticity assessment response generated by the behavioral biometrics server computer in response to the authenticity assessment request and based on the at least a portion of the transaction data. The server computer is programmed and/or configured to generate, based on the authenticity assessment response, an authentication response message configured to authenticate or decline the transaction.

In some non-limiting embodiments or aspects, the authorization request message may be initiated by a user of the payment device through a merchant webpage or mobile application. The authenticity assessment request may be communicated to the behavioral biometrics server computer while the user is responding to a second factor authentication process in the merchant webpage or the mobile application. The server computer may be further programmed and/or configured to embed a behavioral biometrics service in the merchant webpage or the mobile application based on a first URL and a second URL. The first URL may point to a domain of an issuer system and the second URL may point to a domain of the behavioral biometrics server computer. The server computer may be further programmed and/or configured to, in response to the authenticity assessment response indicating a lack of authenticity of the user and/or the payment device, communicate an alert to at least one of the merchant webpage, the mobile application, and the issuer system.

In some non-limiting embodiments or aspects, the server computer may be further programmed and/or configured to communicate the authentication response message to an issuer system associated with the issuer of the payment device. The authentication response message may be configured to authenticate or decline the transaction when evaluated by the issuer system in combination with a user response to the second factor authentication process.

In some non-limiting embodiments or aspects, the authentication assessment response may be based on behavioral biometrics signals associated with the payment device and/or user that are collected, prior to the transaction being initiated, by the behavioral biometrics server computer in a separate communication channel to a transaction processing network of the server computer.

In some non-limiting embodiments or aspects, the server computer may be further programmed and/or configured to configure the authentication response message to authenticate or decline the transaction based on a comparison of the authenticity assessment response to a predetermined threshold provided by the merchant system.

According to non-limiting embodiments or aspects, provided is a computer program product for authenticating a transaction based on behavioral biometric data. The computer program product includes at least one non-transitory computer-readable medium including program instructions that, when executed by at least one processor, cause the at least one processor to receive an authorization request message associated with a transaction between the merchant system and a payment device. The authorization request message includes transaction data. The program instructions cause the at least one processor to determine that an additional security authentication should be applied to the authorization request message based on the transaction data. The program instructions cause the at least one processor to communicate an authenticity assessment request to a behavioral biometrics server computer in response to determining that the additional security authentication should be applied. The authenticity assessment request includes at least a portion of the transaction data. The program instructions cause the at least one processor to receive, from the behavioral biometrics server computer, an authenticity assessment response generated by the behavioral biometrics server computer in response to the authenticity assessment request and based on the at least a portion of the transaction data. The program instructions cause the at least one processor to generate, based on the authenticity assessment response, an authentication response message configured to authenticate or decline the transaction.

In some non-limiting embodiments or aspects, the authorization request message may be initiated by a user of the payment device through a merchant webpage or mobile application. The authenticity assessment request may be communicated to the behavioral biometrics server computer while the user is responding to a second factor authentication process in the merchant webpage or the mobile application. The program instructions may cause the at least one processor to embed a behavioral biometrics service in the merchant webpage or the mobile application based on a first URL and a second URL. The first URL may point to a domain of an issuer system and the second URL may point to a domain of the behavioral biometrics server computer. The program instructions may cause the at least one processor to, in response to the authenticity assessment response indicating a lack of authenticity of the user and/or the payment device, communicate an alert to at least one of the merchant webpage, the mobile application, and the issuer system.

In some non-limiting embodiments or aspects, the program instructions may cause the at least one processor to communicate the authentication response message to an issuer system associated with the issuer of the payment device. The authentication response message may be configured to authenticate or decline the transaction when evaluated by the issuer system in combination with a user response to the second factor authentication process.

In some non-limiting embodiments or aspects, the authentication assessment response may be based on behavioral biometrics signals associated with the payment device and/or user that are collected, prior to the transaction being initiated, by the behavioral biometrics server computer in a separate communication channel to a transaction processing network of the server computer.

According to non-limiting embodiments or aspects, provided is a computer-implemented method for authenticating a transaction based on behavioral biometrics data. The computer-implemented method includes storing, with at least one processor of a behavioral biometrics server computer, behavioral biometrics data including at least one of the following: transaction data associated with a plurality of transactions between at least one merchant and at least one payment device; activity data associated with at least one user of the at least one payment device; or any combination thereof. The method also includes, during the processing of a transaction at a transaction service provider system, receiving, with the at least one processor, an authenticity assessment request including at least a portion of transaction data of the transaction. The method further includes generating, with the at least one processor using a behavioral biometrics model and the stored behavioral biometrics data, an authenticity assessment based on the at least a portion of the transaction data. The method further includes communicating, with the at least one processor, an authenticity assessment response including at least a portion of the authenticity assessment to the transaction service provider system, the authenticity assessment response configured to cause the transaction service provider to authenticate or decline the transaction.

Further non-limiting embodiments or aspects are set forth in the following numbered clauses:

Clause 1: A computer-implemented method comprising: receiving, with a transaction service provider system comprising at least one processor, an authorization request message associated with a transaction between a merchant system and a payment device, the authorization request message comprising transaction data; determining, with the at least one processor, that an additional security authentication should be applied to the authorization request message based on the transaction data; communicating, with the at least one processor, an authenticity assessment request to a behavioral biometrics server computer in response to determining that the additional security authentication should be applied, the authenticity assessment request comprising at least a portion of the transaction data; receiving, with the at least one processor from the behavioral biometrics server computer, an authenticity assessment response generated by the behavioral biometrics server computer in response to the authenticity assessment request and based on the at least a portion of the transaction data; and generating, with the at least one processor based on the authenticity assessment response, an authentication response message configured to authenticate or decline the transaction.

Clause 2: The computer-implemented method of clause 1, wherein the authorization request message is initiated by a user of the payment device through a merchant webpage or mobile application, and wherein the authenticity assessment request is communicated to the behavioral biometrics server computer while the user is responding to a second factor authentication process in the merchant webpage or the mobile application.

Clause 3: The computer-implemented method of clause 1 or 2, further comprising embedding a behavioral biometrics service in the merchant webpage or the mobile application based on a first URL and a second URL, wherein the first URL points to a domain of an issuer system and the second URL points to a domain of the behavioral biometrics server computer.

Clause 4: The computer-implemented method of any of clauses 1-3, further comprising, in response to the authenticity assessment response indicating a lack of authenticity of the user and/or the payment device, communicating an alert to at least one of the merchant webpage, the mobile application, and the issuer system.

Clause 5: The computer-implemented method of any of clauses 1-4, further comprising communicating, with the at least one processor, the authentication response message to an issuer system associated with an issuer of the payment device, the authentication response message configured to authenticate or decline the transaction when evaluated by the issuer system in combination with a user response to the second factor authentication process.

Clause 6: The computer-implemented method of any of clauses 1-5, wherein the authentication assessment response is based on behavioral biometrics signals associated with the payment device and/or user that are collected, prior to the transaction being initiated, by the behavioral biometrics server computer in a separate communication channel to a transaction processing network of the transaction service provider system.

Clause 7: The computer-implemented method of any of clauses 1-6, further comprising configuring the authentication response message to authenticate or decline the transaction based on a comparison of the authenticity assessment response to a predetermined threshold provided by the merchant system.

Clause 8: A system comprising at least one server computer including at least one processor, the at least one server computer programmed and/or configured to: receive an authorization request message associated with a transaction between a merchant system and a payment device, the authorization request message comprising transaction data; determine that an additional security authentication should be applied to the authorization request message based on the transaction data; communicate an authenticity assessment request to a behavioral biometrics server computer in response to determining that the additional security authentication should be applied, the authenticity assessment request comprising at least a portion of the transaction data; receive, from the behavioral biometrics server computer, an authenticity assessment response generated by the behavioral biometrics server computer in response to the authenticity assessment request and based on the at least a portion of the transaction data; and generate, based on the authenticity assessment response, an authentication response message configured to authenticate or decline the transaction.

Clause 9: The system of clause 8, wherein the authorization request message is initiated by a user of the payment device through a merchant webpage or mobile application, and wherein the authenticity assessment request is communicated to the behavioral biometrics server computer while the user is responding to a second factor authentication process in the merchant webpage or the mobile application.

Clause 10: The system of clause 8 or 9, wherein the server computer is further programmed and/or configured to embed a behavioral biometrics service in the merchant webpage or the mobile application based on a first URL and a second URL, wherein the first URL points to a domain of an issuer system and the second URL points to a domain of the behavioral biometrics server computer.

Clause 11: The system of any of clauses 8-10, wherein the server computer is further programmed and/or configured to, in response to the authenticity assessment response indicating a lack of authenticity of the user and/or the payment device, communicate an alert to at least one of the merchant webpage, the mobile application, and the issuer system.

Clause 12: The system of any of clauses 8-11, wherein the server computer is further programmed and/or configured to communicate the authentication response message to an issuer system associated with an issuer of the payment device, the authentication response message configured to authenticate or decline the transaction when evaluated by the issuer system in combination with a user response to the second factor authentication process.

Clause 13: The system of any clauses 8-12, wherein the authentication assessment response is based on behavioral biometrics signals associated with the payment device and/or user that are collected, prior to the transaction being initiated, by the behavioral biometrics server computer in a separate communication channel to a transaction processing network of the server computer.

Clause 14: The system of any of clauses 8-13, wherein the server computer is further programmed and/or configured to configure the authentication response message to authenticate or decline the transaction based on a comparison of the authenticity assessment response to a predetermined threshold provided by the merchant system.

Clause 15: A computer program product comprising at least one non-transitory computer-readable medium including program instructions that, when executed by at least one processor, cause the at least one processor to: receive an authorization request message associated with a transaction between a merchant system and a payment device, the authorization request message comprising transaction data; determine that an additional security authentication should be applied to the authorization request message based on the transaction data; communicate an authenticity assessment request to a behavioral biometrics server computer in response to determining that the additional security authentication should be applied, the authenticity assessment request comprising at least a portion of the transaction data; receive, from the behavioral biometrics server computer, an authenticity assessment response generated by the behavioral biometrics server computer in response to the authenticity assessment request and based on the at least a portion of the transaction data; and generate, based on the authenticity assessment response, an authentication response message configured to authenticate or decline the transaction.

Clause 16: The computer program product of clause 15, wherein the authorization request message is initiated by a user of the payment device through a merchant webpage or mobile application, and wherein the authenticity assessment request is communicated to the behavioral biometrics server computer while the user is responding to a second factor authentication process in the merchant webpage or the mobile application.

Clause 17: The computer program product of clause 15 or 16, wherein the program instructions further cause the at least one processor to embed a behavioral biometrics service in the merchant webpage or the mobile application based on a first URL and a second URL, wherein the first URL points to a domain of an issuer system and the second URL points to a domain of the behavioral biometrics server computer.

Clause 18: The computer program product of any of clauses 15-17, wherein the program instructions further cause the at least one processor to, in response to the authenticity assessment response indicating a lack of authenticity of the user and/or the payment device, communicate an alert to at least one of the merchant webpage, the mobile application, and the issuer system.

Clause 19: The computer program product of any of clauses 15-18, wherein the program instructions further cause the at least one processor to communicate the authentication response message to an issuer system associated with an issuer of the payment device, the authentication response message configured to authenticate or decline the transaction when evaluated by the issuer system in combination with a user response to the second factor authentication process.

Clause 20: The computer program product of any of clauses 15-19, wherein the authentication assessment response is based on behavioral biometrics signals associated with the payment device and/or user that are collected, prior to the transaction being initiated, by the behavioral biometrics server computer in a separate communication channel to a transaction processing network of the server computer.

Clause 21: A computer-implemented method comprising: storing, with at least one processor of a behavioral biometrics server computer, behavioral biometrics data comprising at least one of the following: transaction data associated with a plurality of transactions between at least one merchant and at least one payment device; activity data associated with at least one user of the at least one payment device; or any combination thereof; during the processing of a transaction at a transaction service provider system: receiving, with the at least one processor, an authenticity assessment request comprising at least a portion of transaction data of the transaction; generating, with the at least one processor using a behavioral biometrics model and the stored behavioral biometrics data, an authenticity assessment based on the at least a portion of the transaction data; communicating, with the at least one processor, an authenticity assessment response comprising at least a portion of the authenticity assessment to the transaction service provider system, the authenticity assessment response configured to cause the transaction service provider to authenticate or decline the transaction.

The features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which:

FIG. 1 is a diagram of a non-limiting embodiment or aspects of an environment in which systems, apparatuses, and/or methods, as described herein, may be implemented;

FIG. 2 is a flowchart illustrating non-limiting embodiments or aspects of a method for authenticating a transaction based on behavioral biometric data according to the principles of the present disclosure;

FIG. 4 is a diagram of non-limiting embodiments or aspects of components of one or more devices of FIG. 1.

DETAILED DESCRIPTION

Figure 3:
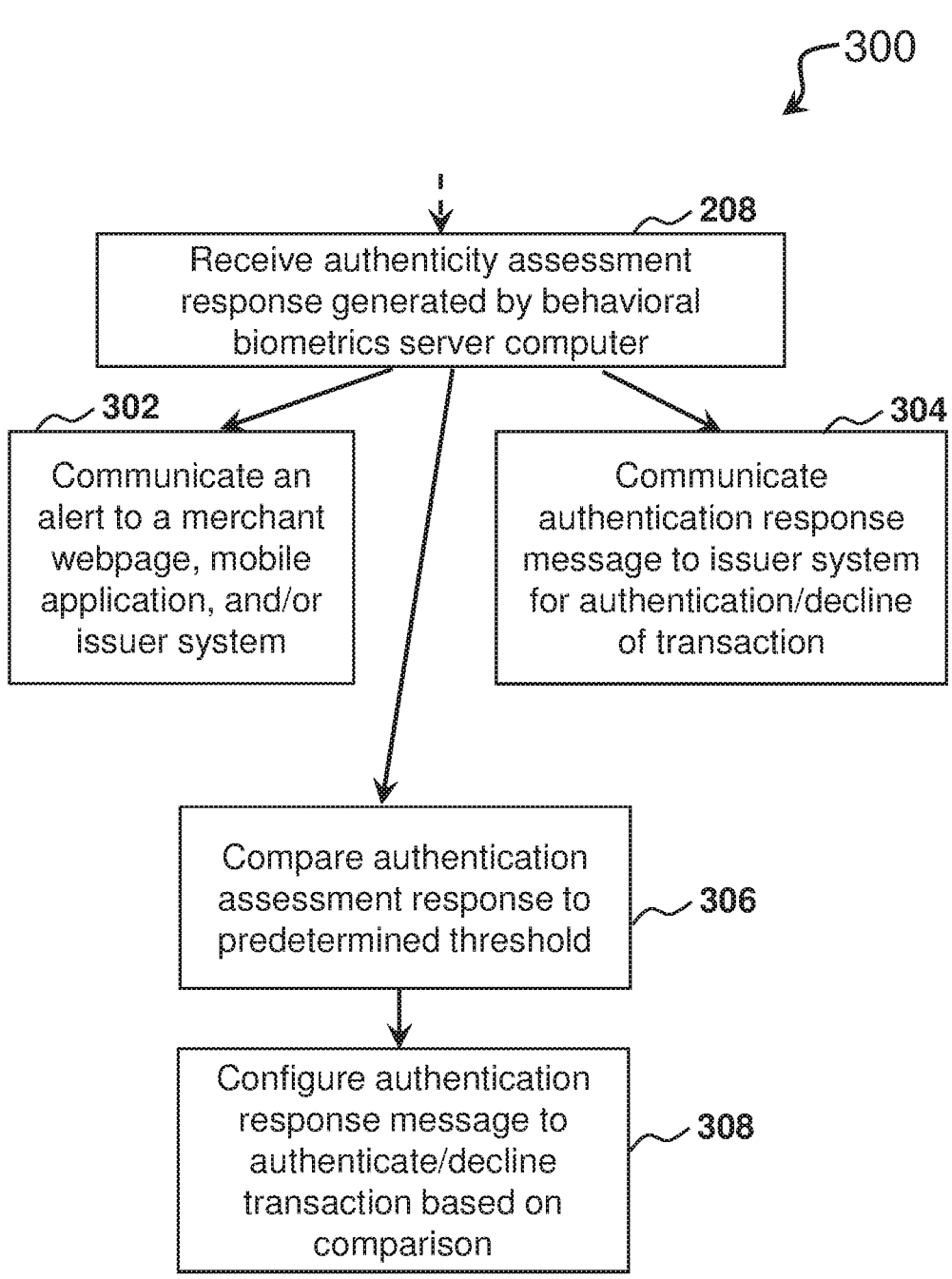
FIG. 3 is a flowchart illustrating non-limiting embodiments or aspects of a method for authenticating a transaction based on behavioral biometric data according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure.

Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices. As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "domain" refers to one or more networks or network hosts within the same physical or logical infrastructure. A domain may be identified by a domain name, a network address, and/or the like.

As used herein, the term "behavioral biometrics" may refer to the measurement of human behavioral patterns and their use to verify and authenticate a user requesting a transaction or computer activity. In some non-limiting embodiments or aspects, such human behavioral patterns may include, but are not limited to, patterns of transaction data of a user of a payment device, patterns of network communication data of a user of a computing device, patterns of device usage (e.g., movement of an input device, keystrokes, and/or the like), and other patterns of behavior that may be monitored on a computing device.

Non-limiting embodiments or aspects of the present disclosure are directed to systems, methods, and computer program products for authenticating a transaction based on behavioral biometric data. By virtue of the features described by the present disclosure, for example, systems processing payment transactions (e.g., transaction service provider systems, payment gateway systems, issuer systems, and/or the like) may more quickly determine the identity of a user initiating a transaction (e.g., a payment transaction). In some non-limiting embodiments or aspects, systems processing payment transactions may determine the identity of the user initiating a transaction and, based on this determination, may approve or not approve the transaction before taking additional time or sending additional communications to authenticate the transaction and/or proceed toward sending a final authorization response message to a merchant system. By determining the identity of the individual, such systems processing such payment transactions may forego transmitting authorization request messages where doing so, even if approved, would not result in an approved transaction. As a result, computational resources are conserved in that unnecessary communications between systems are foregone where the transaction is identified as possibly fraudulent. Computational resources may be further preserved by executing behavioral biometrics analysis in parallel to other authentication processes.

In some non-limiting embodiments or aspects, systems processing such payment transactions may forward data including an indication that the transaction is or is not fraudulent, reducing the burden on other systems (e.g., issuer systems). Since, for example, a transaction service provider system may have access to more transaction data than an individual issuer system may have access to, the transaction service provider system may be able to make a determination as to whether the transaction is fraudulent without requesting additional information, whereas an issuer system may need to request additional information from one or more other issuer systems (e.g., in cases where the issuer system involved in the transaction has a lower volume of historical transactions to analyze when determining whether the instant transaction is a fraudulent transaction). Accordingly, system resources and communication (e.g., bandwidth) between systems in an electronic payment processing network may be conserved, freeing such resources for subsequently-received transactions.

Referring now to FIG. 1, illustrated is a schematic diagram of an example environment 100 in which devices, systems, and/or methods, described herein, may be implemented. As shown in FIG. 1, environment 100 includes a payment device 104 of a user 102, a merchant system 106, a transaction service provider system 108, a directory server 110 that may be associated with the transaction service provider system 108, a behavioral biometrics server computer 112 (e.g., associated with a behavioral biometrics system, which may be integral with the transaction service provider system 108 or a separate, independent system), a user interface 114 (e.g., a computing device executing a merchant webpage, a mobile application, etc.), and an issuer system 116. It will be appreciated that the environment 100 may include numerous different issuer systems, behavioral biometrics server computers, and/or other components.

Payment device 104 may include one or more devices capable of being in communication with merchant system 106 and/or behavioral biometrics server computer 112. Payment device 104 may communicate with the merchant system 106 and the behavioral biometrics server computer 112 in a shared communication channel (e.g., using the same communication channel), which may reduce computer resources for system implementation. Alternatively, payment device 104 may communicate with the merchant system 106 in a first communication channel (e.g., within an electronic payment processing network) and may communicate with the behavioral biometrics server computer 112 in a second communication channel (e.g., outside the electronic payment processing network), which may provide parallel processing efficiencies by dividing total processing time into separate processing channels, thereby reducing overall processing time. Payment device 104 may be associated with a user 102 and may include a computing device configured to operate and display the user interface 114. Payment device 104 may also be capable of communicating via a short-range wireless communication connection.

Merchant system 106 may include a computing device, such as a server, a group of servers, a client device, a group of client devices, peripheral devices capable of being used by a merchant to conduct a transaction C with a user 102, such as a POS device and/or a POS system, and/or other like devices. Merchant system 106 may include one or more devices capable of being in communication with a payment device 104, a transaction service provider system 108, a behavioral biometrics server computer 112, and/or the like. Payment device 104 may communicate with merchant system 106 (e.g., through a network connection associated with user interface 114) to generate a transaction request for completion of a transaction C between merchant system 106 and payment device 104. Merchant system 106 may also be capable of communicating via a short-range wireless communication connection.

Issuer system 116 may include one or more devices capable of being in communication with a transaction service provider system 108, a payment device 104, and/or merchant system 106. For example, issuer system 116 may include a computing device, such as a server, a group of servers, and/or other like devices. In some non-limiting embodiments or aspects, issuer system 116 may be associated with an issuer institution as described herein. For example, issuer system 116 may be associated with an issuer institution that issued a credit account, debit account, credit card, debit card, and/or the like to a user 102, associated with the payment device 104 of the user 102.

Transaction service provider system 108 may include a computing device, such as a server, a group of servers, and/or other like devices. In some non-limiting embodiments or aspects, transaction service provider system 108 may be associated with a transaction service provider as described herein. In some non-limiting embodiments or aspects, transaction service provider system 108 may be associated with and/or in communication with an entity that provides payment services to one or more merchants as described herein. In some non-limiting embodiments or aspects, transaction service provider system 108 may be capable of being in communication with a data storage device, which may be local or remote to the transaction service provider system 108. In some non-limiting embodiments or aspects, transaction service provider system 108 may be capable of receiving information from, storing information in, communicating information to, or searching information stored in the data storage device. In some non-limiting embodiments or aspects, transaction service provider system 108 may be associated with and/or include a behavioral biometrics server computer 112, a directory server computer 110, and/or other like computing devices and/or systems.

Transaction service provider system 108 may receive, from the merchant system 106, an authorization request message D associated with the transaction C between the merchant system 106 and the payment device 104. The authorization request message D may include a communication in an electronic payment processing network including transaction data pertaining to a transaction between the merchant and the user (e.g., where such transaction data is used to authorize the transaction). The authorization request message may include a 3-D Secure (3DS) authentication request including a transaction identifier. The authorization request message D may include transaction data, which may include, but is not limited to: a payment device identifier, a user identifier, a merchant system identifier, a transaction time, a transaction amount, a transaction type, a transaction description, a merchant type, a payment device type, and/or the like.

The transaction service provider system 108 may determine that an additional security authentication should be applied to the authorization request message D based on the transaction data. The determination may be based on one or more portions of the transaction data. An initial security authentication may include a proof of possession, proof of knowledge, or proof of inherency on behalf of the user 102 (e.g., to satisfy a 3-D Secure transaction scheme). For example, an initial security authentication may include, but is not limited to, the provision of a password, the provision of an identifier of the payment device and/or user, the provision of a card verification value (CVV) code, a two-factor authentication process (e.g., one-time password), and/or the like. An additional security authentication may include a process of authenticating the user 102 using behavioral biometrics data. The transaction service provider system 108 may communicate an authenticity assessment request E to a behavioral biometrics server computer 112 in response to determining that the additional security authentication should be applied. The authenticity assessment request E may include at least a portion of the transaction data (e.g., a payment device identifier, a user identifier, etc.). The authenticity assessment request E may be communicated to the behavioral biometrics server computer 112 while the user 102 is responding to a second factor authentication process in the user interface 114 (e.g., merchant webpage, mobile application, etc.). For example, the transaction service provider system 108, issuer system 116, or merchant system 106 may communicate a proof of knowledge challenge (e.g., password request) or proof of possession challenge (e.g., one-time password sent to a mobile device of the user 102) to the user 102 via the user interface 114, during which the behavioral biometrics server computer 112 may be communicated the authenticity assessment request E. The foregoing provides for parallel processing of multiple transaction authentication processes, which reduces overall computer processing time and resources.

Directory server computer 110 may include a computing device, such as a server, a group of servers, a client device, a group of client devices, peripheral devices capable of being used by a transaction service provider to communicate authenticity assessment requests to a behavioral biometrics server computer 112, and/or other like devices. Directory server computer 110 may be included in a transaction service provider system 108. Directory server computer 110 may include one or more devices capable of being in communication with a merchant system 106, behavioral biometrics server computer 112, issuer system 116, and/or the like. The directory server computer 110 may be programmed and/or configured to update authorization request messages D or authorization response messages G based on authenticity assessments from the behavioral biometrics server computer 112. For example, the directory server computer 110 may remove the card verification value (CVV) from an authorization request message D if the authenticity assessment indicates that the transaction C is likely fraudulent. Additionally or alternatively, the directory server computer 110 may insert authenticity assessment data from the behavioral biometrics server computer 112 into messages (e.g., authorization request messages H) communicated to the issuer system 116.

The behavioral biometrics server computer 112 may communicate with a payment device 104, a user interface 114, and/or another computing device associated with a user 102 to collect behavioral biometrics signals based on activity data, which may include, but is not limited to, transaction activity (e.g., transaction data history, including transaction locations, transaction times, transaction amounts, transaction types, merchant types, etc.) or other user activity (e.g., user computing device location data, time of user computing device communications, user network activity, etc.). The behavioral biometrics server computer 112 may include one or more devices capable of being in communication with a payment device 104, a merchant system 106, a user interface 114, a transaction service provider system 108, a directory server computer 110, and/or an issuer system 116. The behavioral biometrics server computer 112 may be associated with a behavioral biometrics system and one or more non-transitory computer storage devices (e.g., a database of behavioral biometrics data). The behavioral biometrics server computer 112 may store behavioral biometrics data of the behavioral biometrics signals, which may include, but is not limited to, transaction data associated with a plurality of transactions between one or more merchants and one or more payment devices, activity data associated with one or more users, and/or the like.

Behavioral biometrics server computer 112 may receive the authenticity assessment request E from the transaction service provider system 108. The authenticity assessment request E may be received during processing (e.g., after receipt of an authorization request message D from the merchant system 106 but before sending an authorization response message G to the merchant system 106) of the transaction C by the transaction service provider system 108 between the payment device 104 and the merchant system 106. The behavioral biometrics server computer 112 may generate, using a behavioral biometrics model and stored behavioral biometrics data, an authenticity assessment based on at least a portion of the transaction data. A behavioral biometrics model may apply one or more machine-learning techniques, executed by one or more processors, to identify one or more patterns in activity data (e.g., transaction activity and/or user activity) and generate a profile of such patterns indicative of authentic user/payment device behavior. If the transaction C exhibits a type of transaction activity and/or user activity that comports with the generated profile of the user/payment device, then the behavioral biometrics model may assess the transaction C as authentic (e.g., generate a metric, parameter, value, and/or the like indicative of the transaction C being not likely fraudulent). If the transaction C exhibits a type of transaction activity and/or user activity that does not comport with the generated profile of the user/payment device, then the behavioral biometrics model may assess the transaction C as inauthentic (e.g., generate a metric, parameter, value, and/or the like indicative of the transaction C being likely fraudulent).

In some non-limiting embodiments or aspects, the authenticity assessment of a transaction may be determined based on the behavioral biometrics model, where the behavioral biometrics model is a machine learning model generated based at least partially on (e.g., trained) the transaction data associated with the plurality of transactions. In some non-limiting embodiments or aspects, the behavioral biometrics model may be trained (e.g., by behavioral biometrics server computer 112) based on historical transaction data associated with one or more historical transactions involving a plurality of payment devices. For example, the behavioral biometrics model may be trained (e.g., by behavioral biometrics server computer 112) based on historical transaction data associated with one or more historical transactions involving one or more payment devices, where the plurality of payment devices includes a payment device 104 associated with the user 102.

The behavioral biometrics server computer 112 may communicate an authenticity assessment response F to the transaction service provider system 108. The authenticity assessment response F may include at least a portion of the authenticity assessment (e.g., a metric, parameter, value, and/or the like indicative of a likelihood of the transaction C being fraudulent or not). The authenticity assessment response F may be configured to cause the transaction service provider system 108 to authenticate or decline the transaction C. For example, the transaction service provider system 108 may decline or authenticate the transaction C based on a metric, parameter, value, and/or the like indicative of a likelihood of the transaction C being fraudulent or not, communicated in the authenticity assessment response F. The transaction service provider system 108 may generate an authentication response message G based on the authenticity assessment response F. The authentication response message G may be configured to authenticate or decline the transaction C. The transaction service provider system 108 may communicate an authorization request message H to the issuer system 116 prior to or after sending the authenticity assessment request E or receiving the authenticity assessment response F. In this manner, the evaluation of behavioral biometrics may be executed before or after requesting authorization of the transaction C by the issuer system 116, but before final settlement and approval of the transaction C at the transaction service provider system 108.

In some non-limiting embodiments or aspects, the transaction service provider system 108 may authenticate or decline a transaction based on the authenticity assessment associated with the authenticity assessment response F. The authenticity assessment may be a binary determination that the transaction is fraudulent or not fraudulent, based on which the transaction service provider system 108 may directly act. Alternatively or additionally, transaction service provider system 108 may compare the authenticity assessment to a threshold value to determine whether the assessment satisfies the threshold value (e.g., whether the predicted value of a likelihood of authenticity is greater than, equal to, or less than the threshold value). In such an example, the threshold value may be associated with a value that, when satisfied, indicates that the transaction is a valid transaction and, when not satisfied, indicates that the transaction is a fraudulent transaction. In some non-limiting embodiments or aspects, the threshold value may be a predetermined threshold provided by merchant system 106. For example, merchant system 106 may receive, from the merchant, input that specifies at least one predetermined threshold, the at least one predetermined threshold associated with a value that, when satisfied by an authenticity assessment, the merchant will permit transactions to be approved (e.g., transactions may be approved by the merchant where the transactions are associated with a prediction that the transaction has a likelihood of 90% or more of being a non-fraudulent transaction, a likelihood of 80% or more of being a non-fraudulent transaction, and/or the like).

In some non-limiting embodiments or aspects, the transaction service provider system 108 may authenticate or decline a transaction based on a multi-factor authentication process. In such an example, transaction service provider system 108 may receive data from one or more systems of environment 100 and/or may request data from the one or more systems of environment 100. In such an example, the data received and/or requested by transaction service provider system 108 may include, without limitation, behavioral biometric measurement data associated with a behavioral biometric measurement of the user associated with payment device 104, user interface 114, and/or another computing device (e.g., where the behavioral biometric measurement is measured by the payment device 104, user interface 114, another computing device, and/or merchant system 106). In another example, transaction service provider system 108 may transmit an out-of-band message to a computing device of the user 102 to determine whether the user 102 associated with the computing device is the user 102 in control of the computing device. For example, transaction service provider system 108 may transmit a message to a computing device of the user 102 (e.g., a computing device executing a user interface 114) causing the computing device to display a graphical user interface (GUI) prompting the user 102 to provide input (e.g., a physical biometric measurement, a PIN, a password, and/or the like) to verify that the user 102 that is operating the computing device is the user 102 that is associated with the computing device (e.g., payment device 104, user interface 114, and/or other computing device).

User interface 114 may be associated with (e.g., may include or be in communication with) a computing device operating a merchant webpage, a mobile application, and/or the like. A behavioral biometrics service may be embedded in the user interface 114 based on a first URL that points to a domain of an issuer system 116 and a second URL that points to a domain of the behavioral biometrics server computer 112. For example, if the user interface 114 is presented in a web browser, a webpage may be configured with one or more frames pointing to different domains (e.g., first URL and second URL). The first URL may allow for communications with the issuer system 116, which may initiate further authentication tests (e.g., proofs of knowledge, proofs of possession, etc.). The second URL may allow for communications with the behavioral biometrics server computer 112, such as to collect behavioral biometrics data from the user 102. In other examples, the behavioral biometrics service may be invoked as a background service on a mobile device and/or a client-side script that communicates with the issuer system 116 and/or behavioral biometrics server computer 112 via one or more APIs.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Referring now to FIG. 2, illustrated is a flowchart of non-limiting embodiments or aspects of a process 200 for authenticating a transaction based on behavioral biometric data. It will be appreciated that, in non-limiting embodiments or aspects, a process 200 may include additional, fewer, and/or different steps and a different order of steps. In some non-limiting embodiments or aspects, one or more of the steps of process 200 may be performed (e.g., completely, partially, and/or the like) by transaction service provider system 108 (e.g., one or more devices of transaction service provider system 108, such as directory server computer 110). In some non-limiting embodiments or aspects, one or more of the steps of process 200 may be performed (e.g., completely, partially, and/or the like) by another device or a group of devices separate from or including transaction service provider system 108, such as payment device 104 (e.g., one or more devices of payment device 104), merchant system 106 (e.g., one or more devices of merchant system 106), behavioral biometrics server computer 112 (e.g., one or more devices of behavioral biometrics server computer 112), and/or issuer system 116 (e.g., one or more devices of issuer system 116).

As shown in FIG. 2, at step 202, the transaction service provider system receives an authorization request message associated with a transaction between a merchant system and a payment device. The authorization request message may be initiated by a user of the payment device through a user interface (e.g., merchant webpage, mobile application, etc.). In such an example, the transaction service provider system may receive the transaction authorization request from the merchant system. In some non-limiting embodiments or aspects, the transaction service provider system may receive the transaction authorization request from the merchant system based on the user associated with payment device initiating a transaction. For example, the user associated with payment device may initiate the transaction by causing payment device to engage with merchant system (e.g., by bringing a mobile device having an electronic wallet and/or an application associated with an electronic wallet stored thereon in proximity to a POS terminal to initiate payment during the transaction, by providing input to a laptop computer during an electronic commerce transaction to initiate the transaction, and/or the like). The authorization request message includes transaction data.

In some non-limiting embodiments or aspects, the merchant system may generate a transaction authorization request based on determining transaction data associated with a transaction. For example, the merchant system may receive user data associated with a user, the user being associated with the payment device. The user data may include account data associated with a payment account (e.g., a PAN, a PIN, a token, and/or the like that is associated with the payment account). In some non-limiting embodiments or aspects, when generating a transaction authorization request, the merchant system may include merchant system data associated with merchant system (e.g., a POS identifier specifying a POS device, a transaction identifier associated with the new transaction, and/or the like). In some non-limiting embodiments or aspects, merchant system data associated with merchant system may include merchant system type data associated with an indication as to the type of merchant system involved in the new transaction (e.g., whether the merchant system is a POS terminal installed at a brick-and-mortar location, a website hosted by and/or on behalf of merchant system, and/or the like). In some non-limiting embodiments or aspects, the merchant system may generate a transaction authorization request based on receiving data from a payment device to initiate the new transaction. For example, the merchant system may generate a transaction authorization request. The transaction authorization request may include transaction data associated with the transaction, user data associated with the user, account data associated with the payment account, merchant system data associated with the merchant system, and/or the like.

As shown in FIG. 2, at step 204, the transaction service provider system determines that an additional security authentication should be applied to the authorization request message based on the transaction data. For example, the transaction service provider system may determine that the payment device of the transaction, using a payment device identifier, is associated with an issuer institution that has specified that behavioral biometrics should be employed as a secondary form of authentication. The transaction service provider system may also identify the transaction as having a transaction data profile indicative of requiring an additional security authentication (e.g., determined by a fraud prevention system). The transaction service provider system may determine that an additional security authentication should be applied based on (e.g., during) processing of the transaction authorization request. For example, transaction service provider system may determine that an additional security authentication should be applied prior to and/or after transmitting an authorization request message to issuer system, where issuer system maintains the payment account of the user. Additionally or alternatively, transaction service provider system may determine that an additional security authentication should be applied based on (e.g., in response to) receiving a request from issuer system and/or merchant system for a determination of an authenticity assessment for the new transaction.

At step 206, the transaction service provider communicates an authenticity assessment request to a behavioral biometrics server computer. The communication may be in response to the determination that the additional security authentication should be applied. The authenticity assessment request may include at least a portion of the transaction data, including, but not limited to, a payment device identifier, a user identifier, an issuer institution identifier, and/or the like. At step 208, the transaction service provider system receives, from the behavioral biometrics server computer, an authenticity assessment response generated by the behavioral biometrics server computer in response to the authenticity assessment request. The authenticity assessment response may be based on the portion or all of transaction data communicated to the behavioral biometrics server computer.

At step 210, the transaction service provider system generates an authentication response message configured to authenticate or decline the transaction. The authentication response message is based on (e.g., at least partly on) the authenticity assessment response. For example, the authentication assessment may indicate a likelihood of the transaction being authentic such that, when evaluated by the transaction service provider system in combination with a second factor authentication (e.g., one-time password), there is a strong likelihood the transaction is not fraudulent. Based on that combined evaluation, the transaction service provider system may authenticate the transaction. In another example, if the authenticity assessment indicates a strong likelihood the transaction was not authorized by the user, the transaction service provider system may decline the transaction even if a second factor authentication test is passed.

Referring now to FIG. 3, illustrated is a flowchart of non-limiting embodiments or aspects of a process 300 for authenticating a transaction based on behavioral biometric data. It will be appreciated that, in non-limiting embodiments or aspects, a process 300 may include additional, fewer, and/or different steps and a different order of steps. In some non-limiting embodiments or aspects, one or more of the steps of process 300 may be performed (e.g., completely, partially, and/or the like) by transaction service provider system 108 (e.g., one or more devices of transaction service provider system 108, such as directory server computer 110). In some non-limiting embodiments or aspects, one or more of the steps of process 300 may be performed (e.g., completely, partially, and/or the like) by another device or a group of devices separate from or including transaction service provider system 108, such as payment device 104 (e.g., one or more devices of payment device 104), merchant system 106 (e.g., one or more devices of merchant system 106), behavioral biometrics server computer 112 (e.g., one or more devices of behavioral biometrics server computer 112), and/or issuer system 116 (e.g., one or more devices of issuer system 116).

As shown in FIG. 3, at step 208, the transaction service provider system receives, from the behavioral biometrics server computer, an authenticity assessment response generated by the behavioral biometrics server computer in response to the authenticity assessment request. The authenticity assessment response may be based on the portion or all of transaction data communicated to the behavioral biometrics server computer. At step 302, the transaction service provider system, in response to the authenticity assessment response indicating a lack of authenticity of the user (e.g., the transaction requester is not authorized or the user actually associated with the payment device) and/or the payment device (e.g., the payment device is an unauthorized duplicate, the payment device is stolen, etc.), may communicate an alert to the user interface (e.g., merchant webpage, mobile application, etc.), the issuer system, and/or the merchant system. The alert may be a communication identifying the transaction and may further cause the receiving party to execute fraud prevention countermeasures (e.g., locking accounts, preventing future transaction associated with a payment device, etc.).

At step 304, the transaction service provider system may communicate the authentication response message to an issuer system associated with an issuer of the payment device. The authentication response message may be configured to authenticate or decline the transaction when evaluated by the issuer system in combination with a user response to a second factor authentication process. For example, the user interface may prompt the user to complete a second factor authentication, provided by the first URL pointing to a domain of an issuer system. The issuer system may receive the second factor authentication attempt by the user and compare the submission to the authentication response message received from the transaction service provider system. If the combination of authentication tests indicates a likelihood of fraud or inauthenticity, the transaction may be declined at the issuer system. Similarly, if the combination of authentication tests indicates a likelihood of a genuine, authorized transaction, the transaction may be approved at the issuer system.

At step 306, the transaction service provider system may compare the authentication assessment response to a predetermined threshold provided by the merchant system. For example, if the authenticity assessment is configured to output a percent likelihood of the transaction being authorized by the user, the merchant may set a percent threshold that, when satisfied by the authenticity assessment, triggers approval of the transaction. Similarly, when the predetermined threshold is not satisfied, the transaction may be automatically declined. The establishment of predetermined thresholds provides for fewer communications between computer systems by which to authenticate transactions, reducing overall network processing resources and bandwidth required. At step 308, the transaction service provider system may configured the authentication response message to authenticate or decline the transaction based on the comparison of the authenticity assessment response to the predetermined threshold provided by the merchant system.

Referring now to FIG. 4, illustrated is a diagram of example components of device 400. Device 400 may correspond to one or more devices of payment device 104, merchant system 106, transaction service provider system 108, directory server computer 110, behavioral biometrics server computer 112, user interface 114, and/or issuer system 116. In some non-limiting embodiments or aspects, one or more devices of payment device 104, merchant system 106, transaction service provider system 108, directory server computer 110, behavioral biometrics server computer 112, user interface 114, and/or issuer system 116 may include at least one device 400 and/or at least one component of device 400. As shown in FIG. 4, device 400 may include bus 402, processor 404, memory 406, storage component 408, input component 410, output component 412, and communication interface 414.

Bus 402 may include a component that permits communication among the components of device 400. In some non-limiting embodiments or aspects, processor 404 may be implemented in hardware, software, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 406 may include random access memory (RAM), read-only memory (ROM), and/or another type of dynamic or static storage device (e.g., flash memory, magnetic memory, optical memory, etc.) that stores information and/or instructions for use by processor 404.

Storage component 408 may store information and/or software related to the operation and use of device 400. For example, storage component 408 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 410 may include a component that permits device 400 to receive information, such as via user input (e.g., a touchscreen display, a keyboard, a keypad, a mouse, a button, a switch, a microphone, a camera, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.).

Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a WiFi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 406 and/or storage component 408 may include data storage or one or more data structures (e.g., a database, and/or the like). Device 400 may be capable of receiving information from, storing information in, communicating information to, or searching information stored in the data storage or one or more data structures in memory 406 and/or storage component 408. For example, the information may include encryption data, input data, output data, transaction data, account data, or any combination thereof.

The number and arrangement of components shown in FIG. 4 are provided as an example. In some non-limiting embodiments or aspects, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

With further reference to the foregoing figures, in non-limiting embodiments or aspects, the described systems and methods may be provided in the form of a behavioral biometrics cloaking service (BBCS), in which "cloaking" may refer to the provision of an additional layer of authentication. BBCS may be applied under the context of 3D-Secure (3DS) to satisfy the Revised Payment Services Directive (PSD2) Strong Customer Authentication (SCA) mandate. The BBCS is not limited to this use case, however, and may be provided outside of a PSD2 SCA context, so that issuers may enhance their digital transaction authentication without having to make significant technology updates to the issuer access control server (ACS). Issuers further do not have to provide individual computer resources for BBCS signal collection, decision making, and responses.

The SCA mandate includes steps of authentication based on proof of knowledge, proof of possession, and proof of inherence. BBCS can be employed to allow issuers to meet two or more of these steps of authentication. BBCS may be employed on top of existing step-up authentication services (e.g., one-time passwords). BBCS provides an efficient, non-time-consuming authentication while allowing for a modular, independent integration with existing authentication systems. BBCS can provide multifactor compliance in both 3DS 2.x and 3DS 1.0 environments. BBCS may be employed for web applications, native applications, and other channels.

BBCS may be provided as a standalone service, such as part of the transaction service provider system, e.g., a directory server service. BBCS may be provided directly to the issuer/ACS provider. BBCS provides the ability to gather behavioral biometrics signals for a given 3DS transaction. BBCS provides the ability to evaluate and make decisions based on behavioral biometrics signals. BBCS further provides the ability to combine the success/failure of another authentication process (e.g., one-time passwords) with the behavioral biometrics authentication to provide a final response to components within the 3DS ecosystem (e.g., a directory server of a transaction processing system, a 3DS server, a merchant system, etc.).

In a 3DS 2.x web browser process flow, the directory server may register the method URL endpoint that supports both the behavioral biometrics code as well as the issuer/ACS provider's method URL. In a 3DS 2.x native application flow, a software development kit (SDK) may be provided for first party or third party behavioral biometrics that will collect and send the signals to a BBCS server in parallel to device data collected according to EMV specifications. In a 3DS 1.0 process flow, the issuer ACS step-up window may be framed within a BBCS-provided URL, which may allow for signal collection code to be executed during the step-up authentication process.

In non-limiting embodiments or aspects, evaluation and decision making based on behavioral biometric signals may be performed based on the technology framework for the BBCS implementation, e.g., as a local or remote callout to the technology provider. BBCS may be a learning system, where profiles of behavioral biometric data may be maintained and improved over time. Depending on the point of integration of BBCS, different approaches may be taken to combine responses from BBCS and from alternative means of authentication (e.g., one-time passwords), and to provide the outcome. For example, a transaction identifier captured during behavioral biometric signal collection may be provided to a directory server, which can update a transaction request or response based on the decision from the BBCS server and drop the cardholder verification value (CVV) if a transaction fails the BBCS evaluation. Alternatively, the URL for BBCS integration may be overridden to allow for transaction request values to be updated based on behavioral biometric decision making. Alternatively, a directory server can initiate a request to a BBCS server and receive the decision, which can be passed into an authentication response from the directory server to the ACS. The information can be added as an extension to the issuer authentication request. Alternatively, the BBCS server may proxy 3DS messages between the directory server and ACS and appropriately update the transaction request or authentication response message. The proxy can reside between the 3DS server and directory server and update the response appropriately.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method comprising:

receiving, with a transaction service provider system comprising at least one processor, historic transaction data associated with one or more historical transactions involving a payment device of a user;

displaying, with a computing device of the user executing a merchant webpage or a mobile application, a user interface configured with a first frame pointing to a first domain of an issuer via a first uniform resource locator (URL), the first URL configured to allow communication between the computing device and an issuer system of the issuer separate from the transaction service provider system, and the user interface further configured with a second frame pointing to a second domain of a behavioral biometrics server computer of the transaction service provider system via a second URL, the second URL configured to allow communication between the computing device and the behavioral biometrics server computer;

receiving, with the at least one processor of the transaction service provider system, an authorization request message from a merchant system, the authorization request message associated with a transaction between the merchant system and the payment device, the authorization request message initiated by the user of the payment device through the merchant webpage or the mobile application, and the authorization request message comprising transaction data;

determining, with the at least one processor of the transaction service provider system, that an additional security authentication should be applied to the authorization request message based on the transaction data and based on the payment device being associated with the issuer that has specified that behavioral biometrics should be employed as a secondary form of authentication;

communicating, with the at least one processor of the transaction service provider system, a request to the merchant webpage or the mobile application for a user response to a second factor authentication process in the first frame;

in response to determining that the additional security authentication should be applied, and before the authorization request message is transmitted to the issuer system of the issuer, communicating, with the at least one processor of the transaction service provider system, an authenticity assessment request to the behavioral biometrics server computer that is associated with the transaction service provider system and independent of the issuer system, the authenticity assessment request communicated to the behavioral biometrics server computer while the user is responding to the second factor authentication process in the first frame, and the authenticity assessment request comprising at least a portion of the transaction data;

collecting, with at least one processor of the behavioral biometrics server computer, behavioral biometrics signals based on (i) the historic transaction data received from the transaction service provider system and, (ii) user activity data received from the computing device via the second frame;

receiving, with the at least one processor of the transaction service provider system from the behavioral biometrics server computer, an authenticity assessment response generated by the behavioral biometrics server computer in response to the authenticity assessment request and based on the at least a portion of the transaction data and at least a portion of the behavioral biometrics signals received via the second frame, wherein the authenticity assessment response comprises authenticity assessment data;

in response to receiving the authenticity assessment response and before the authorization request message is transmitted to the issuer system, inserting, with the at least one processor of the transaction service provider system, at least a portion of the authenticity assessment data into the authorization request message to produce an updated authorization request message;

transmitting, with the at least one processor of the transaction service provider system, the updated authorization request message to the issuer system; and generating, with the at least one processor of the transaction service provider system based on the authenticity assessment response, an authentication response message to the issuer system, wherein the authentication response message is configured to authenticate the transaction when the portion of the authenticity assessment data is evaluated by the issuer system in combination with the user response to the second factor authentication process.

2. The computer-implemented method of claim 1, further comprising, in response to the authenticity assessment response indicating a lack of authenticity of the user and/or the payment device, communicating an alert to at least one of the merchant webpage, the mobile application, and the issuer system.

3. The computer-implemented method of claim 1, further comprising configuring the authentication response message to authenticate the transaction based on a comparison of the authenticity assessment response to a predetermined threshold provided by the merchant system.

4. The computer-implemented method of claim 1, wherein the behavioral biometrics server computer receives the at least a portion of behavioral biometrics signals via the second frame of the user interface while the user responds to the second factor authentication process in the first frame of the user interface, such that overall computer processing time for transaction authentication is reduced.

5. A system comprising:

a computing device of a user executing a merchant webpage or a mobile application, the computing device programmed and/or configured to display a user interface configured with a first frame pointing to a first domain of an issuer via a first uniform resource locator (URL), the first URL configured to allow communication between the computing device and an issuer system of the issuer separate from a transaction service provider system, and the user interface further configured with a second frame pointing to a second domain of a behavioral biometrics server computer of the transaction service provider system via a second URL, the second URL configured to allow communication between the computing device and the behavioral biometrics server computer;

at least one server computer of the transaction service provider system, the at least one server computer including at least one processor, the at least one server computer programmed and/or configured to:

receive historic transaction data associated with one or more historical transactions involving a payment device of the user;

receive an authorization request message from a merchant system, the authorization request message associated with a transaction between the merchant system and the payment device, the authorization request message initiated by the user of the payment device through the merchant webpage or the mobile application, and the authorization request message comprising transaction data;

determine that an additional security authentication should be applied to the authorization request message based on the transaction data and based on the payment device being associated with the issuer that has specified that behavioral biometrics should be employed as a secondary form of authentication;

communicate a request to the merchant webpage or the mobile application for a user response to a second factor authentication process in the first frame;

in response to determining that the additional security authentication should be applied, and before the authorization request message is transmitted to the issuer system of the issuer, communicate an authenticity assessment request to the behavioral biometrics server computer that is associated with a transaction service provider system and independent of the issuer system, the authenticity assessment request communicated to the behavioral biometrics server computer while the user is responding to the second factor authentication process in the first frame, and the authenticity assessment request comprising at least a portion of the transaction data;

receive, from the behavioral biometrics server computer, an authenticity assessment response generated by the behavioral biometrics server computer in response to the authenticity assessment request and based on the at least a portion of the transaction data and at least a portion of behavioral biometrics signals received via the second frame, wherein the authenticity assessment response comprises authenticity assessment data;

in response to receiving the authenticity assessment response and before the authorization request message is transmitted to the issuer system, insert at least a portion of the authenticity assessment data into the authorization request message to produce an updated authorization request message;

transmit the updated authorization request message to the issuer system; and generate, based on the authenticity assessment response, an authentication response message to the issuer system, wherein the authentication response message is configured to authenticate the transaction when the portion of the authenticity assessment data is evaluated by the issuer system in combination with the user response to the second factor authentication process; and the behavioral biometrics server computer comprising at least one processor programmed and/or configured to collect the behavioral biometrics signals based on (i) the historic transaction data received from the transaction service provider system and, (ii) user activity data received from the computing device via the second frame.

6. The system of claim 5, wherein the server computer is further programmed and/or configured to, in response to the authenticity assessment response indicating a lack of authenticity of the user and/or the payment device, communicate an alert to at least one of the merchant webpage, the mobile application, and the issuer system.

7. The system of claim 5, wherein the server computer is further programmed and/or configured to configure the authentication response message to authenticate or decline the transaction based on a comparison of the authenticity assessment response to a predetermined threshold provided by the merchant system.

8. The system of claim 5, wherein the at least one processor of the behavioral biometrics server computer is further programmed and/or configured to receive the at least a portion of behavioral biometrics signals via the second frame of the user interface while the user responds to the second factor authentication process in the first frame of the user interface, such that overall computer processing time for transaction authentication is reduced.

9. A computer program product comprising at least one non-transitory computer-readable medium including program instructions that, when executed by at least one processor of a computing device of a user executing a merchant webpage or a mobile application, cause the at least one processor of the computing device to:

display a user interface configured with a first frame pointing to a first domain of an issuer via a first uniform resource locator (URL), the first URL configured to allow communication between the computing device and an issuer system of the issuer separate from a transaction service provider system, and the user interface further configured with a second frame pointing to a second domain of a behavioral biometrics server computer of the transaction service provider system via a second URL, the second URL configured to allow communication between the computing device and the behavioral biometrics server computer;

wherein the program instructions further cause at least one processor of the transaction service provider system to:

receive historic transaction data associated with one or more historical transactions involving a payment device of the user;

receive an authorization request message from a merchant system, the authorization request message associated with a transaction between the merchant system and the payment device, the authorization request message initiated by the user of the payment device through the merchant webpage or the mobile application, and the authorization request message comprising transaction data;

determine that an additional security authentication should be applied to the authorization request message based on the transaction data and based on the payment device being associated with the issuer that has specified that behavioral biometrics should be employed as a secondary form of authentication;

communicate a request to the merchant webpage or the mobile application for a user response to a second factor authentication process in the first frame;

in response to determining that the additional security authentication should be applied, and before the authorization request message is transmitted to the issuer system of the issuer, communicate an authenticity assessment request to the behavioral biometrics server computer that is associated with a transaction service provider system and independent of the issuer system, the authenticity assessment request communicated to the behavioral biometrics server computer while the user is responding to the second factor authentication process in the first frame, and the authenticity assessment request comprising at least a portion of the transaction data;

receive, from the behavioral biometrics server computer, an authenticity assessment response generated by the behavioral biometrics server computer in response to the authenticity assessment request and based on the at least a portion of the transaction data and at least a portion of behavioral biometrics signals received via the second frame, wherein the authenticity assessment response comprises authenticity assessment data;

in response to receiving the authenticity assessment response and before the authorization request message is transmitted to the issuer system, insert at least a portion of the authenticity assessment data into the authorization request message to produce an updated authorization request message;

transmit the updated authorization request message to the issuer system; and generate, based on the authenticity assessment response, an authentication response message to the issuer system, wherein the authentication response message is configured to authenticate the transaction when the portion of the authenticity assessment data is evaluated by the issuer system in combination with the user response to the second factor authentication process; and wherein the program instructions further cause at least one processor of the behavioral biometrics server computer to:

collect the behavioral biometrics signals based on (i) the historic transaction data received from the transaction service provider system and, (ii) user activity data received from the computing device via the second frame.

10. The computer program product of claim 9, wherein the program instructions further cause the at least one processor of the transaction service provider system to, in response to the authenticity assessment response indicating a lack of authenticity of the user and/or the payment device, communicate an alert to at least one of the merchant webpage, the mobile application, and the issuer system.

11. The computer program product of claim 9, wherein the program instructions cause the behavioral biometrics server computer to receive the at least a portion of behavioral biometrics signals via the second frame of the user interface while the user responds to the second factor authentication process in the first frame of the user interface, such that overall computer processing time for transaction authentication is reduced.

\* \* \* \* \*